United States Patent
Lawrie et al.

(10) Patent No.: US 11,953,432 B2
(45) Date of Patent: Apr. 9, 2024

(54) QUANTUM ENHANCED MAGNETO-OPTICAL MICROSCOPY AND SPECTROSCOPY

(71) Applicant: UT-Battelle, LLC, Oak Ridge, TN (US)

(72) Inventors: Benjamin J. Lawrie, Oak Ridge, TN (US); Yun-Yi Pai, Oak Ridge, TN (US); Chengyun Hua, Knoxville, TN (US); Raphael C. Pooser, Knoxville, TN (US); Claire E. Marvinney, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/877,308

(22) Filed: Jul. 29, 2022

(65) Prior Publication Data
US 2023/0039230 A1 Feb. 9, 2023

Related U.S. Application Data

(60) Provisional application No. 63/227,432, filed on Jul. 30, 2021.

(51) Int. Cl.
*G01J 3/45* (2006.01)
*G01N 21/31* (2006.01)

(52) U.S. Cl.
CPC ... *G01N 21/31* (2013.01); *G01N 2201/06113* (2013.01); *G01N 2201/0636* (2013.01); *G01N 2201/10* (2013.01)

(58) Field of Classification Search
CPC .......... G01N 21/31; G01N 21/00; G01N 2201/06113; G01N 2201/0636;
(Continued)

(56) References Cited

U.S. PATENT DOCUMENTS 4,681,446 A * 7/1987 Yeh .............. G01C 19/72
356/460
10,605,727 B2 3/2020 Lukens et al.
(Continued)

OTHER PUBLICATIONS

Pooser, R. et al., "Ultrasensitive measurement of microcantilever displacement below the shot-noise limit, " Optica, May 2015, pp. 393-399, vol. 2, No. 5.
(Continued)

*Primary Examiner* — Abdullahi Nur
(74) *Attorney, Agent, or Firm* — Scully, Scott, Murphy & Presser, P.C.

(57) ABSTRACT

A system comprising a nonlinear medium (NLM), an optical transduction module, a dual homodyne detector and a processor is provided. The NLM receives at least a pump beam and issues the pump, probe and conjugate beams, where the beams are linearly polarized. Optics route the probe, the conjugate or both beams to the sample. The sample imparts polarization rotation to light that interacts therewith. The optical transduction module imparts to the interacted light an optical phase shift that is a 1:1 transduction of the polarization rotation, where at least one of the probe light or the conjugate light carries the imparted optical phase shift. The processor obtains the optical-phase shift based on respective detection signals from the dual homodyne detector and determines, based on the obtained optical-phase shift, at least one of a Faraday polarization rotation, a Kerr polarization rotation or a spin noise spectrum.

28 Claims, 8 Drawing Sheets

(58) Field of Classification Search
CPC ............... G01N 2201/10; G01N 21/21; G01N 2021/218; G01J 3/45; G01J 3/0235; G01J 3/447

See application file for complete search history.

(56) References Cited

U.S. PATENT DOCUMENTS

| | | |
|---|---|---|
| 11,119,386 B2 | 9/2021 | Pooser et al. |
| 2004/0136051 A1* | 7/2004 | Betin .................... H01S 3/2333 359/333 |
| 2006/0051100 A1* | 3/2006 | Watanabe ............... H04J 14/08 398/152 |

OTHER PUBLICATIONS

Anderson, B. et al., "Phase sensing beyond the standard quantum limit with a variation on the SU(1,1) Interferometer," Optica, Jul. 2017, pp. 752-756, vol. 4, No. 7.

Lukens, J. et al., "A naturally stable Sagnac-Michelson nonlinear interferometer", Opt. Lett., 2016, pp. 5438-5441, vol. 41, No. 23.

Pooser, R. et al., "Truncated Nonlinear Interferometry for Quantum-Enhanced Atomic Force Microscopy", Phys. Rev. Lett., Dec. 24, 2019, pp. 1-5, vol. 124, No. 23.

Otterstrom, N. et al., "Nonlinear optical magnetometry with accessible in situ optical squeezing", Optics Letters, Nov. 15, 2014, pp. 6533-6536.

\* cited by examiner

QUANTUM ENHANCED MAGNETO-OPTICAL MICROSCOPY AND SPECTROSCOPY

CROSS-REFERENCE TO RELATED APPLICATIONS

This application claims the benefit of and priority to U.S. Provisional Application Ser. No. 63/227,432 filed on Jul. 30, 2021, the entirety of which are incorporated by reference.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

FIELD OF THE DISCLOSURE

This disclosure relates to magneto-optical microscopy and spectroscopy. More specifically, the disclosure relates to using an optical parametric amplifier to generate a squeezed joint state where at least one interacts with a sample of interest and dual homodyne detection modules are used to characterize a magneto-optical response of the sample.

BACKGROUND

Magneto-optical sensors, such as magneto-optical Kerr effect (MOKE) microscopies and spin noise spectroscopies are used for material characterization including measurements of spin dynamics, hyperfine interactions, spin-orbit interactions and charge-carrier g-factors. However, the measurement sensitivity is limited by the photon shot noise limit (SNL). Sensitivity may be improved in conventional measurements by (1) increasing the laser power; and (2) increasing the readout time.

For instance, shot-noise-limited MOKE measurements offer sensitivity of order $1\times10^{-7}$ rad/$\sqrt{\text{Hz}}$ with 10 µW of laser power in a classical magneto-optical sensor system. Resolving 10 nanoradian polarization rotation then requires either 1 mW of laser power with a 1 s measurement or 10 µW of laser power with a 100s measurement, or some alternative balance between increased power and increased measurement time. But increasing the laser power may be destructive to the sample or induce a change in a photosensitive sample. Additionally, increasing the laser power may induce unwanted heating in a low temperature measurement such as in a cryostat, making quantum measurements nearly impossible.

Increasing the readout time and averaging may improve the measurement sensitivity at the expense of unacceptably long measurement times that suppress transient responses of interest.

SUMMARY

Accordingly, disclosed is a nonlinear interferometer system which may comprise a laser module, a nonlinear medium, optics, an optical transduction module, a dual homodyne detector and a processor. The laser module is configured to produce a source beam which is used to produce at least a pump beam having a first frequency F1. The nonlinear medium may be positioned to receive at least the pump beam and issue the pump beam, a probe beam of light and a conjugate beam of light. The nonlinear medium is configured to produce at least one of the probe light and the conjugate light based on interaction of the received light with the nonlinear medium. The issued beams are linearly polarized. In some aspects, the probe beam of light has a second frequency f2, and the conjugate beam of light has a third frequency f3 such that (f1−f2)=(f3−f1). The optics are configured to route the probe beam along a first path to the sample or the conjugate beam along a second path to the sample or both the probe beam and the conjugate beam to the sample. The sample imparts a Faraday polarization rotation or a Kerr polarization rotation to the light that interacts with the sample. The optical transduction module is configured to imparts to the interacted light an optical phase shift that is a 1:1 transduction of the polarization rotation caused by the sample on the light which interacted with the sample. The optical transduction module may be disposed in the first path, the second path or both the first path and the second path. The dual homodyne detector may comprise a first homodyne detection module and a second homodyne detection module. The first homodyne detection module is configured to receive the probe beam at the end of the first path and output a first detection signal corresponding to the probe light, and the second homodyne detection module is configured to receive the conjugate beam at the end of the second path and output a second detection signal corresponding to the conjugate light. At least one of the probe light or the conjugate light carries the imparted optical phase shift. The processor obtains the optical-phase shift based on the first detection signal and the second detection signal and determines, based on the obtained optical-phase shift, at least one of a Faraday polarization rotation, a Kerr polarization rotation or a spin noise spectrum.

In an aspect of the disclosure, the system comprises an optical parametric amplifier (OPA) which include the nonlinear medium. The nonlinear medium may be selected from a group consisting of a vapor cell, a nonlinear crystalline material, a highly nonlinear fiber (HNF), a nonlinear optomechanical system, and an integrated nonlinear photonic medium. For example, in an aspect of the disclosure, the nonlinear medium may be a vapor cell where the vapor cell is a Rb vapor cell. In other aspects, the nonlinear amplifier is not limited to the above example, and any nonlinear optical medium may be used in the OPA.

In an aspect of the disclosure, when a spin noise spectrum is measured, the optical transduction module may comprise a first quarter-wave plate (QWP) and a second QWP. The first QWP is configured to convert incident light that is linearly polarized along a given direction, to corresponding light that is circularly polarized. The interaction of the sample with the circularly polarized light causes the optical-phase shift of the interacted light. The second QWP configured to convert the interacted light that is circularly polarized and phase-shifted to the interacted light that is phase-shifted and linearly polarized along the given direction. In an aspect of the disclosure, the system may be used in a transmissive mode or configuration where light transmitted through the sample or a reflective mode or configuration with light is reflected by the sample. When in a transmissive mode, the first QWP may be upstream of the sample and the second QWP may be downstream of the sample. In other aspects, when in reflective mode, the sample QWP is both the first QWP and the second QWP.

In an aspect of the disclosure, when the Faraday or Kerr polarization rotation is measured, the system may further comprise at least one photoelastic modulator (PEM). A PEM may be positioned in either the first path of the probe beam, the second path of the conjugate beam or both the first path and the second path. A PEM may be configured to modulate the probe beam, the conjugate beam or both the probe beam and the conjugate beam at a target frequency.

In aspect of the disclosure, where the system comprises a PEM, the optical transduction module may comprise the PEM and a QWP. The PEM may be further configured to convert incident light that is linearly polarized along a given direction, to corresponding light that is circularly polarized. The interaction of the sample with the circularly polarized light causes the optical-phase shift of the interacted light. The QWP is configured to convert the interacted light that is circularly polarized and phase-shifted to the interacted light that is phase-shifted and linearly polarized along the given direction.

In an aspect of the disclosure, the laser module may also produce the source beam which is used to produce both the pump beam and the probe beam. In this aspect, the nonlinear medium is positioned to receive both the probe beam and the pump beam and is configured to produce the conjugate light and amplify the probe beam based on the interaction between the pump light and the probe light with the nonlinear medium. In other aspects, the nonlinear medium may be positioned to receive only the pump beam, and is configured to produce both the probe light and the conjugate light based on the interaction between the pump light with the nonlinear medium.

In an aspect of the disclosure, one of the probe or conjugate beams interacts with the sample while the other bypasses the sample. In this aspect, the first homodyne detection module may be configured to receive the phase-shifted interacted light and produce the first detection signal, and the second homodyne detection module may be configured to receive non-phase-shifted light which did not interact with the sample and produce the second detection signal.

In an aspect of the disclosure, the processor may combine the first detection signal and the second detection signal as a phase-sum signal to obtain the optical phase shift.

In an aspect of the disclosure, both the probe and conjugate beams interact with the sample. In this aspect, the first homodyne detection module may be configured to receive phase-shifted probe light after it has interacted with the sample and produce the first detection signal and the second homodyne detection module may be configured to receive phase-shifted conjugate light after it has interacted with the sample and produce the second detection signal.

In an aspect of the disclosure, the system may be further configured to measure a magnetic circular dichroism. In this aspect, the processor may combine the first detection signal and the second detection signal as an intensity-difference signal in order to measure the magnetic circular dichroism.

In an aspect of the disclosure, the sample may be disposed in a cryostat. The cryostat may comprise one or more optical windows for receiving light to interact with the sample and/or light interacted with the sample.

In an aspect of the disclosure, each homodyne detection module may comprise a beam splitter and a pair of balanced photodetectors. Each homodyne detection module may receive a respective local oscillator. One of the first homodyne detection module and the second homodyne detection module may receive the probe beam and the other of the first homodyne detection module and the second homodyne detection module may receive the conjugate beam.

In an aspect of the disclosure, the system may further comprise a second nonlinear medium. The second nonlinear medium may be positioned upstream of the first homodyne detector and the second homodyne detector and downstream of the nonlinear medium. The second nonlinear medium may be positioned to receive light interacted with the sample or both light interacted with the sample and light not interacted with the sample.

In an aspect of the disclosure, the processor may be configured to control the phase of the respective local oscillator and amplitude of the respective local oscillator. For example, the phase and amplitude of the respective local oscillator may be controlled based on the measured rotation.

In an aspect of the disclosure, the system may further comprise a power regulator positioned upstream of the nonlinear medium. In this aspect, the processor may be configured to control the power regulator and set the ratio of power of the pump beam and the probe beam. In an aspect of the disclosure, the power regulator may comprise a rotatable halfwave plate and a polarization beam splitter. The processor may control the angle of the rotation to control the ratio.

In an aspect of the disclosure, the system may further comprise a user interface configured to receive power settings and sample setting(s).

In an aspect of the disclosure, the system may further comprise a moveable beam block configured to be positioned in a path of a beam used to produce the probe beam and upstream of the nonlinear medium and outside the path. When the beam block is positioned in the path upstream of the nonlinear medium, the probe beam is vacuum seeded.

Also disclosed is an imaging system. The imaging system may generate a 2D image of either the determined Faraday polarization rotation or the determined Kerr polarization rotation from the first detection signal and the second detection signal. The image system comprises a display and a substrate configured to hold the sample. The Faraday polarization rotation or the Kerr polarization rotation may be determined on a pixel-by-pixel basis. In an aspect of the disclosure, the imaging system may further comprise a two-dimensional (2D) motorized stage coupled to the substrate. The processor may be configured to control the 2D motorized stage such that light to be interacted with the sample is scanned 2D across the sample and determine the Faraday polarization rotation or the Kerr polarization rotation for each pixel. In other aspects, the imaging system may further comprise two-dimensional (2D) galvo-scanner or fast-scanning mirror positioned in a path of light to be interacted with the sample. The processor may be configured to control the 2D galvo-scanner or the fast-scanning mirror such that the light to be interacted with the sample is scanned 2D across the sample and determine the Faraday polarization rotation or the Kerr polarization rotation for each pixel.

In an aspect of the disclosure, the imaging system may generate a 3D image of the determined spin noise. In this aspect, the imaging system may comprise a spectrum analyzer.

DETAILED DESCRIPTION

Figure 3:
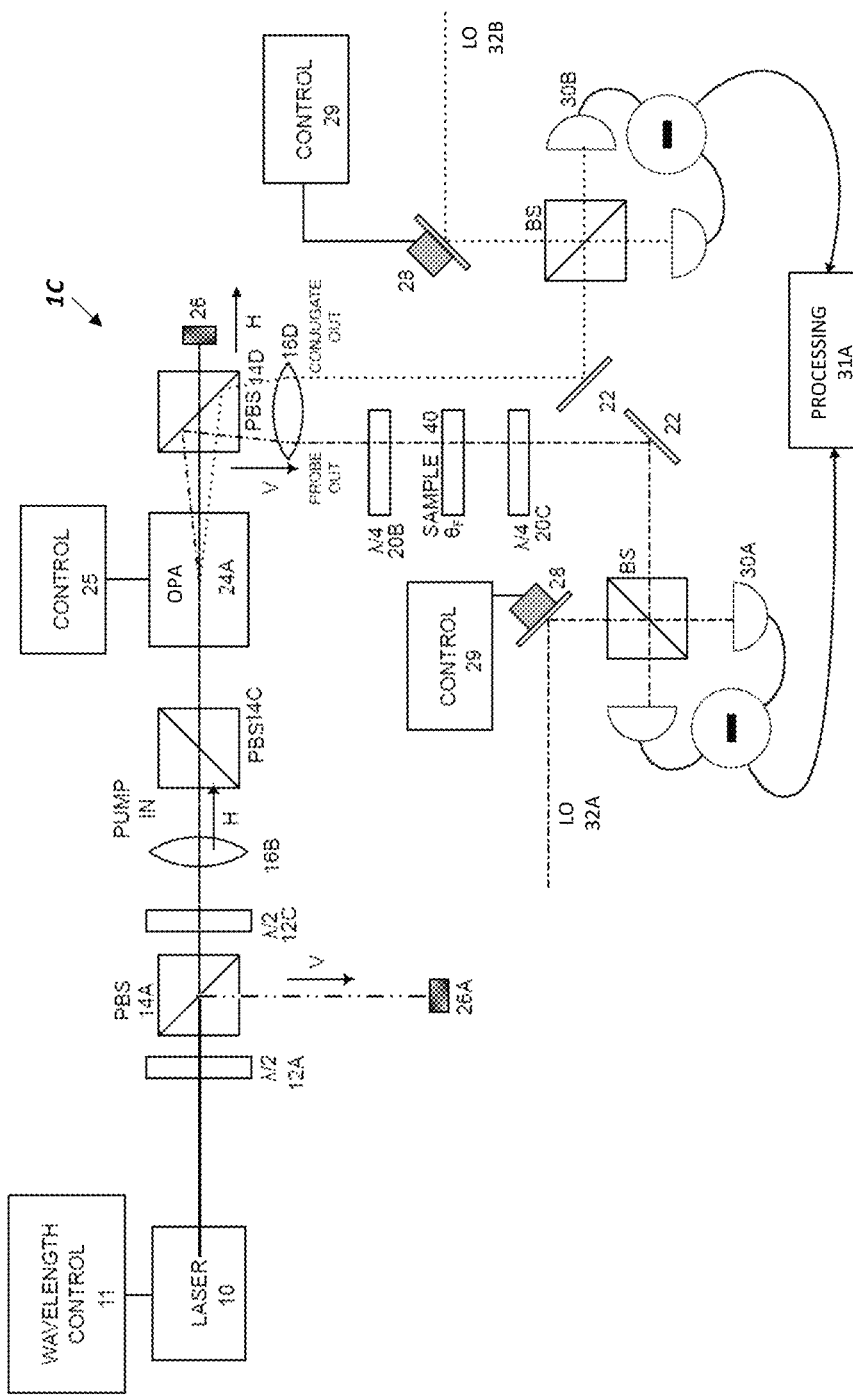
FIG. 3 illustrates another magneto-optical sensor system in accordance with aspects of the disclosure.
Figure 4:
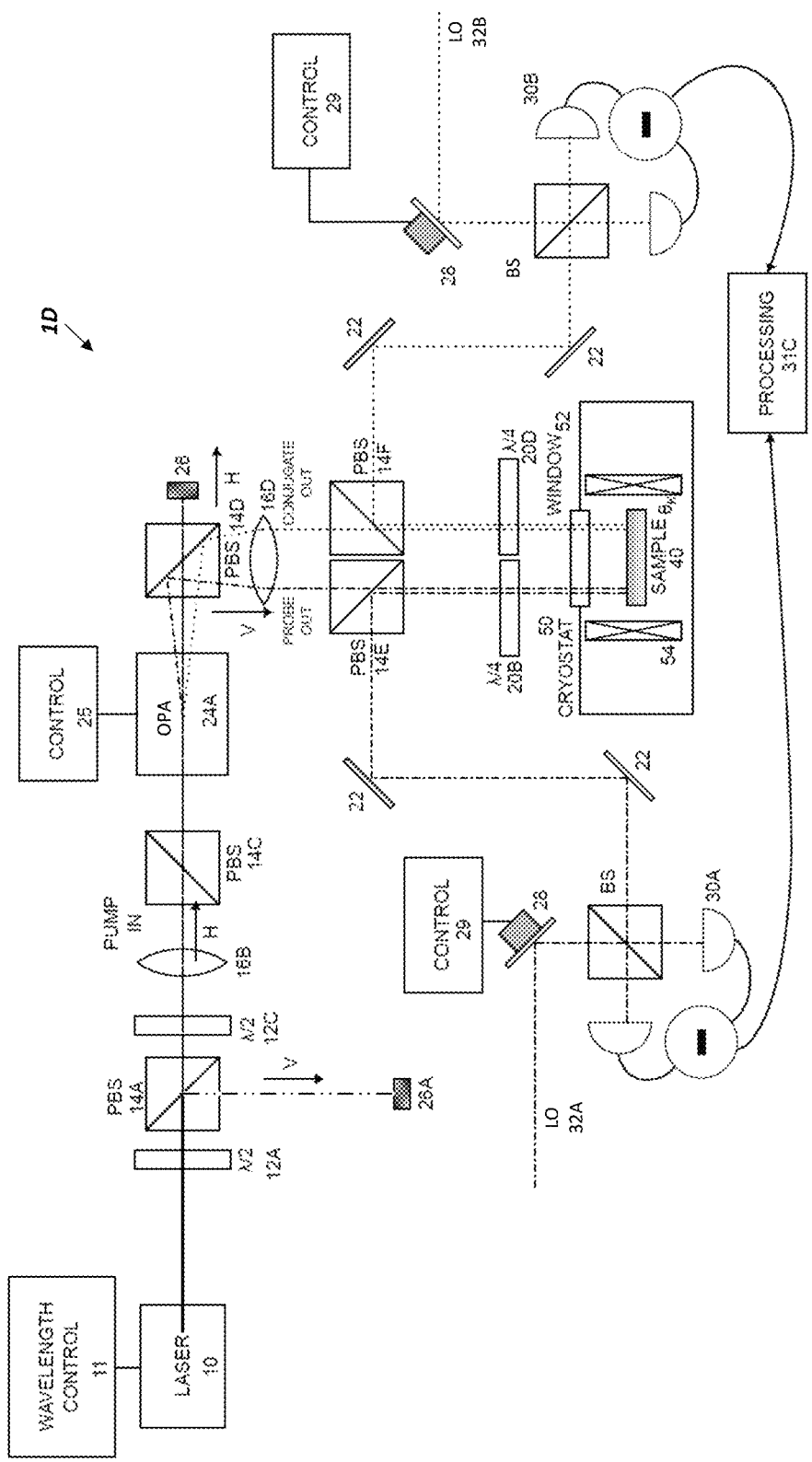
FIG. 4 illustrates another magneto-optical sensor system in accordance with aspects of the disclosure.

Disclosed are magneto-optical sensor systems for spin noise spectroscopy measurements of a Faraday rotation (such as FIGS. 1, 3 and 5), Faraday rotation measurements (without spin noise) (such as FIG. 2) or spin noise spectroscopy measurements of a Kerr rotation (such as FIG. 4). The sensor systems may also be used for Kerr rotation measurements (with or without spin noise). These systems (collectively 1) also referred to as interferometer systems (and in some aspects, nonlinear interferometer systems) cause one of either a probe beam or a conjugate beam or both the probe beam and the conjugate beam to interact with a sample and measure the phase shift.

In some aspects of the disclosure, an optical parametric amplifier with a nonlinear element in the system 1 outputs a squeezed joint state.

For purposes of this description, a truncated magneto-optical sensor system (or truncated interferometer system) refers to a system where beam(s) are passed once through the nonlinear element. A full magneto-optical sensor system (full interferometer system) refers to a system where beam(s) are passed twice through nonlinear element(s). For example, the beam(s) are passed through two nonlinear elements. In other aspects, the beam(s) may be reflected and passed a second time through the same nonlinear element.

Each sensor system comprises a laser source such as laser 10. The laser 10 is connected to a controller, e.g., wavelength control 11 (laser 10 and wavelength control 11 is an example of a laser module). The wavelength control 11 comprises hardware to control the laser power and wavelength (frequency) etc. In an aspect of the disclosure, the laser power may be 150 mW to 200 mW. However, the laser power is not limited to this example. The laser 10 is configured to output a source beam. The source beam is shown in FIGS. 1-5 with a solid line. The laser 10 may be tuned to emit a set spectral bandwidth. The center wavelength may be based on the sample type. For example, for many materials the magneto-optical response is a function of wavelength. In other aspects, the center wavelength may be a function of the nonlinear element used. For example, the center wavelength may be about 795 nm (for use with a Rb vapor cell as the nonlinear element). In some aspects, the laser source may be a Ti:Sapphire laser. However, the laser source is not limited to the same and other laser sources such as laser diodes, gas lasers and other solid-state lasers may be used.

Figure 1:
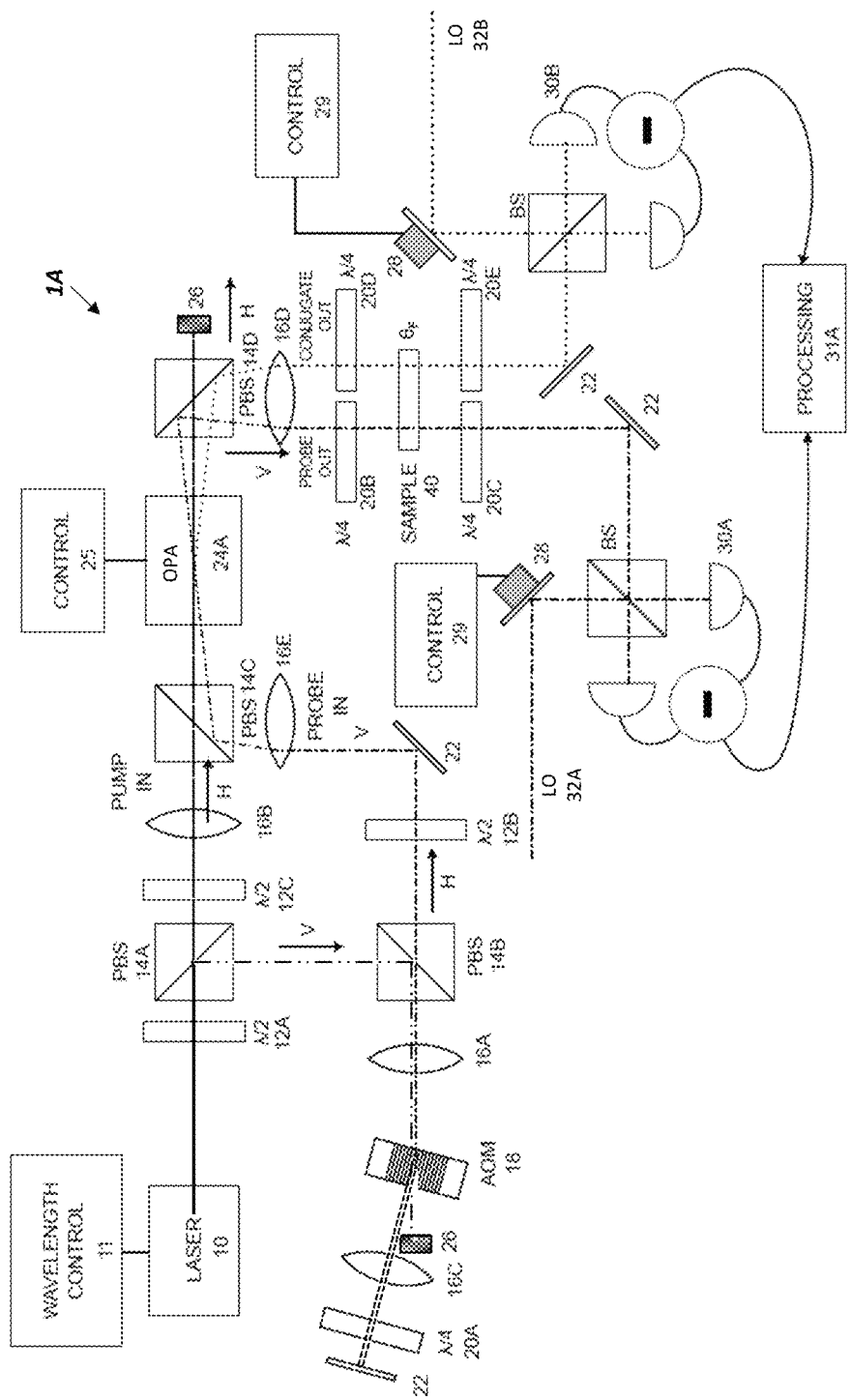
FIG. 1 illustrates a magneto-optical sensor system in accordance with aspects of the disclosure.
Figure 2:
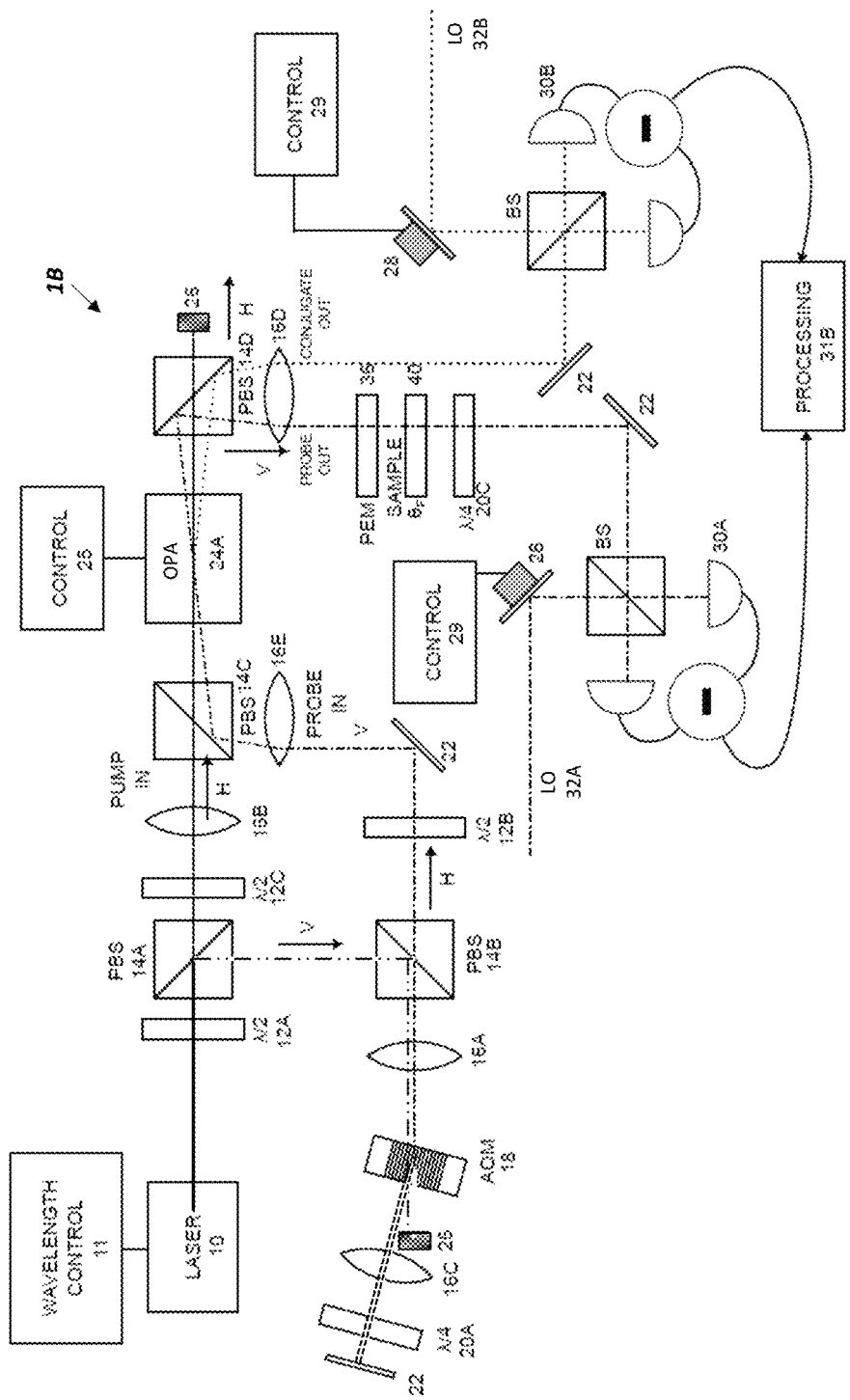
FIG. 2 illustrates another magneto-optical sensor system in accordance with aspects of the disclosure.
Figure 5:
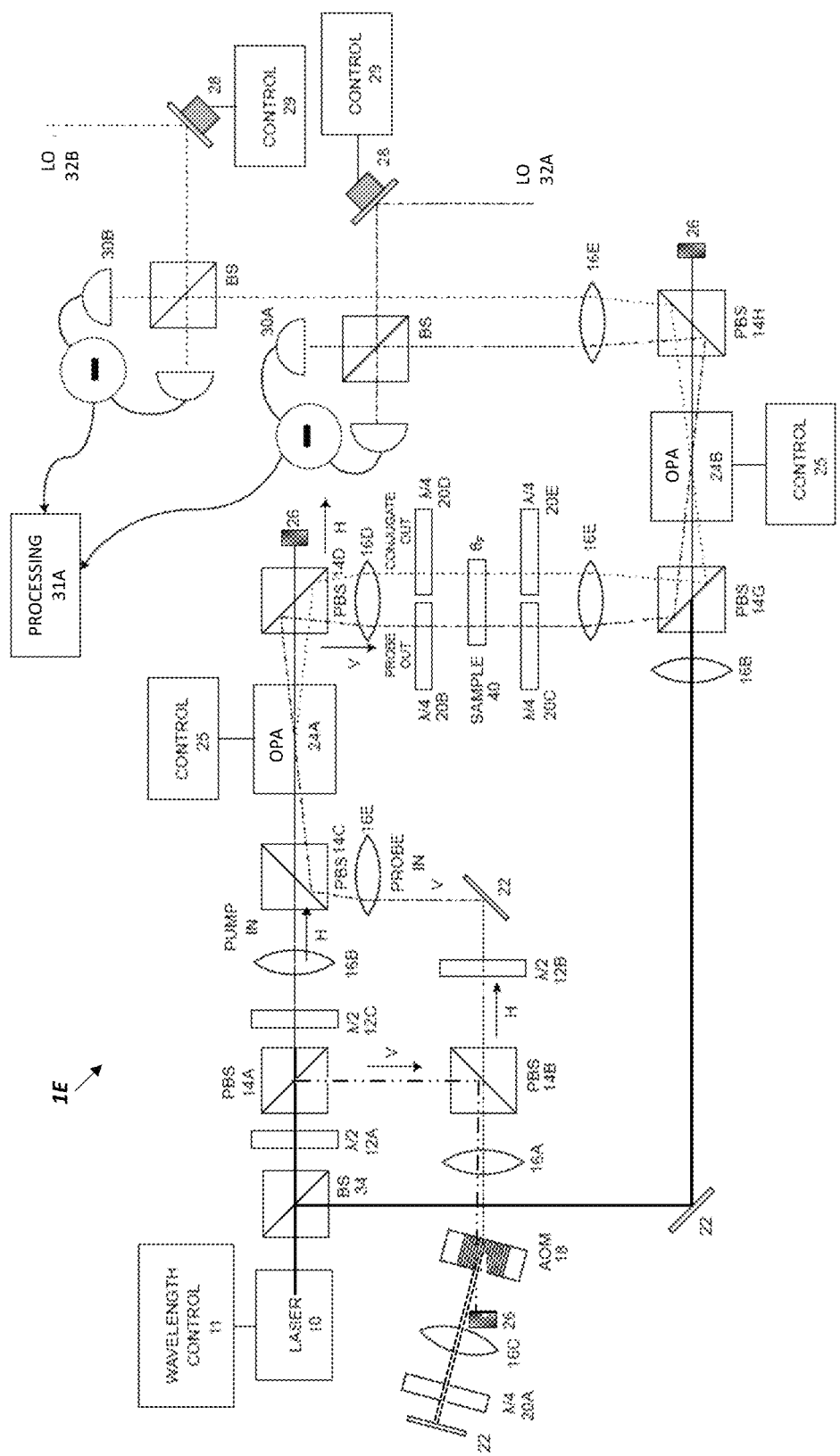
FIG. 5 illustrates another magneto-optical sensor system in accordance with aspects of the disclosure.

FIG. 1 illustrates an example of a truncated magneto-optical sensor system 1A in accordance with aspects of the disclosure. The system 1A has the laser module described above. The system 1A may further comprise a power regulator positioned in the path of the source beam. The power regulator may be used to obtain different powers for a pump beam and an intermediate beam, the latter to be used for producing a probe beam. The pump beam is shown in FIGS. 1-5 with long dashes (long dashed line). The intermediate beam is shown in FIGS. 1-5 as a dashed with two dots repeated line (double dotted-dashed line). In FIGS. 1, 2 and 5, a portion of the intermediate beam and a portion of the probe beam are shown parallel to each other to show both beams. Similarly, the adjusted intermediate beam (forward and reflected) is also shown in parallel to show both portions of the adjusted intermediate beam. The probe beam is shown in FIGS. 1-5 as a single-dot and single-dash line, repeated (dotted-dashed line). In an aspect of the disclosure, the power regulator may comprise a half-wave plate ($\lambda/2$) 12A and a polarization beam splitter (PBS) 14A. The PBS 14A divides the incoming source beam from the $\lambda/2$ 12A into two separate beams (two paths) shown as the pump beam and the intermediate beam. In some aspects, the PBS 14A has a coating which reflects light having a specific polarization and allows through light having an orthogonal polarization. As depicted, the PBS 14A may be transmissive of a horizontal polarization (H) and reflective of a vertical polarization (V).

In some aspects of the disclosure, the $\lambda/2$ 12A may be fixed in a preset orientation such that the output of the PBS 14A has a predefined power ratio of pump and intermediate beams (which causes the set power ratio for the pump and probe beams. In some implementations, the combination of $\lambda/2$ 12A and PBS 14A can be configured to direct 1-10% of the source beam into the intermediate beam and the remaining 90-99% of the source beam into the pump beam. However, in other aspects of the disclosure, the $\lambda/2$ 12A may be rotated to change the power ratio of the pump and intermediate beams (and thus the power of the probe beam). The orientation of the $\lambda/2$ 12A rotates the polarization as desired. For example, the $\lambda/2$ 12A may be mounted on a rotating stage and the angle of rotation of the $\lambda/2$ 12A may be controlled via a processor, as needed to control the power interacting with the sample 40. The rotation of polarization of the source beam to a specific angle between vertical and horizontal results in the source beam having both vertical and horizontal components. The specific angle determines the relative amount of the vertical and horizontal components (after splitting).

In some aspects of the disclosure, a processor may control the $\lambda/2$ 12A to scan the power of the probe beam on the sample 40 from a minimum value to a maximum value. The minimum value may be approximately a vacuum state (e.g., about 0 mW). The maximum value may be less than 10 mW or a set ratio of the pump. The scanning may be used to achieve a target signal-to-noise (SNR) level or sensitivity. In an aspect of the disclosure, the power of the probe beam (Probe In) may also be based on the type of sample. For example, when the sample is photo sensitive, the power of the probe beam may be reduced by reducing the power of the intermediate beam. Additionally, when the measurements are done in a cryostat 50, the power of the probe beam may be minimized to reduce heating.

Optionally, in some aspects, prior to reaching the power regulator, the source beam may be coupled to a fiber cable such as a single mode fiber (SMF). The SMF acts as a spatial mode filter. Additionally, in some aspects, the source beam may be focused and collimated by a lens (not shown) in FIG. 1.

The PBS 14A outputs the V-polarized intermediate beam to another PBS 14B. PBS 14B reflects the V-polarized intermediate beam to a lens 16A. The lens 16A directs the V-polarized intermediate beam to an acousto-optic modulator (AOM) 18. The AOM 18 detunes the beam based on a modulation frequency. The AOM frequency may be about 1.5 GHz (for a Rb vapor-based nonlinear medium). For other nonlinear medium, the AOM frequency may be different. The AOM 18 produces a diffracted beam. A non-diffracted portion of the output of the AOM 18 is blocked by a beam block 26. The unblocked portion (adjusted intermediate beam shown with short dashes repeated, e.g., short, dashed line) is directed to a lens 16C from the AOM 18. The lens 16C collimates the light onto a quarter wave plate (λ/4) 20. The output of the λ/4 20A is reflected by a mirror 22 back through the same λ/4 20A. After reflection back through the same λ/4 20A, the polarity of the light is rotated by 90 degrees, e.g., the light is now H-polarized. The H-polarized light returns to the AOM 18 via lens 16C. This light is again modulated and diffracted. At this point, the light has a frequency shift of twice the modulation frequency, e.g., about 3 GHz (less than the input beam). This light is referred to as the probe beam.

The H-polarized light returns to the PBS 14B via lens 16A. Since now the light is H-polarized, the light transmits through the PBS 14B. Another λ/2 12B is used to rotate the light to a V-polarization. Another mirror 22 (reflective surface) may be used to steer the V-polarized light to another PBS 14C to combine with the pump beam. The V-polarized light may be focused by lens 16E.

Optionally, prior to reaching the λ/2 12B, the H-polarized light may be coupled to a fiber cable such as a SMF and additionally lenses. As noted above, the SMF may act as the spatial mode filter.

In some aspects of the disclosure, another λ/2 12C may be positioned in the path of the pump beam prior to be combined with the probe beam via the PBS 14C. This other λ/2 12C may also be used to control the power of the pump (independent of the probe).

Like lens 16E, which focuses the probe beam, lens 16B focuses the pump beam. In FIG. 1, the inputs to PBS 14C are shown as "pump in" and "probe in". This refers to the set power and frequency of the respective beams which are controlled as described above.

The combined light is focused onto an optical parametric amplifier (OPA). The OPA is formed of a nonlinear element and is shown in FIG. 1 as OPA 24A. The nonlinear medium may be a vapor cell, a nonlinear crystalline material, a highly nonlinear fiber (HNF), a nonlinear optomechanical system, or an integrated nonlinear photonic medium. The nonlinear amplifier is not limited to these systems, and any nonlinear optical medium could be used in the optical parametric amplifier. U.S. Pat. No. 10,605,727 issued on Mar. 31, 2020 (U.S. Pat. No. 10,605,727) describes other examples of nonlinear media which may be used in the systems described herein. U.S. Pat. No. 10,605,727 is incorporated herein by references.

In some aspects of the disclosure, four-wave mixing (FWM) occurs in the OPA 24A. For example, the pump beam and the probe beam propagating from the PBS 14C overlap in the OPA 24A. The interaction of the pump beam and the probe beam forms a conjugate beam (or interaction of just the pump beam with the OPA 24A produces the probe beam and the conjugate beam if the probe is vacuum seeded as described below). The conjugate beam is shown in FIGS. 1-5 as a dotted line.

As described above, the probe beam has a frequency less than the pump beam ($f_{probe} < f_{pump}$). The frequency of the conjugate beam may be higher than the frequency of the pump ($f_{conjugate} > f_{pump}$), and satisfies the following equation:

$$f_{pump} - f_{probe} = f_{conjugate} - f_{pump}.$$

In other aspects, the probe beam may have a frequency greater than the pump beam and the frequency of the conjugate beam may be lower than the frequency of the pump beam, but still satisfying the above equation. As shown, the probe and pump beams are overlapped at a small angle determined by the four-wave mixing phase matching conditions within the OPA 24A.

The nonlinear element has a squeezing parameter r (and a gain G, which is a function of r, $G = \cos h^2(r)$). The squeezing parameter r may be based on the material used for the nonlinear element and the operating conditions of the nonlinear amplifier. For instance, the squeezing parameter r and thus the gain of a nonlinear element comprising an atomic vapor cell can be controlled by varying the vapor density, the cell temperature, the pump laser wavelength, the probe laser wavelength, the overlap angle between pump and probe in the cell, the size of the pump and the probe in the cell, the spatial mode profile of the pump and the probe, and the spectral linewidth of the pump and the probe.

The higher the r, the better the measurement sensitivity. The gain is phase sensitive, when both probe and conjugate channels are seeded by a laser and phase insensitive when one or both probe and conjugate channels is/are seeded by a vacuum state. The quantum correlations between the probe beam and the conjugate beam result in a reduced noise and increased dynamic range for intensity difference and phase sum measurements.

Depending on the type of nonlinear element, the system 1A may also comprise control 25. For example, the control (controller 25) may include a temperature control such as a thermal controller. The thermal controller may comprise temperature sensors and heaters to maintain the temperature of the OPA 24A within a target temperature range. The target temperature range may depend on the size and composition of the nonlinear medium and the interaction volume defined by the laser focus among other factors.

The nonlinear element, e.g., OPA 24A, outputs a pump beam, probe beam and conjugate beam. The probe and conjugate beams are in a squeezed joint state. Each beam is spatially offset from the other as shown in FIG. 1. The outputted beams are provided to a PBS 14D. In an aspect of the disclosure, the conjugate beam has the same polarization as the probe beam (e.g., V-polarization). Therefore, since the pump beam has a different polarization (e.g., H-polarization), the probe beam and the conjugate beam are directionally separated from the pump beam. In PBS 14D, the pump beam is transmitted through, and the probe beam and the conjugate beam are reflected.

In an aspect of the disclosure, the pump beam may be provided to a beam block 26. The beam block 26 may be an absorptive surface of the sensor system 1A such as part of the housing. In other aspects, the beam block 26 may be a dedicated surface within the housing. In other aspects, instead of blocking the pump beam, the pump beam may be used as a source for the local oscillators (LO) 32 and/or to pump another nonlinear element such as having a cell 24B.

In an aspect of the disclosure, since the probe beam and the conjugate beam are spatially separated, they may be independently steered as desired. One or both of the probe beam and/or the conjugate beam may be provided to interact with the sample 40 (also referred to a probe arm and a conjugate arm). As shown in FIG. 1, both the probe beam and the conjugate beam are directed to the sample 40. By having both beams directed to the sample, a phase sum measurement will produce twice the signal compared to a measurement where one of the beams does not interact with the sample 40. This may lead to an increased detection sensitivity while maintaining the power of each beam interacting with the sample relatively low.

Figure 6:
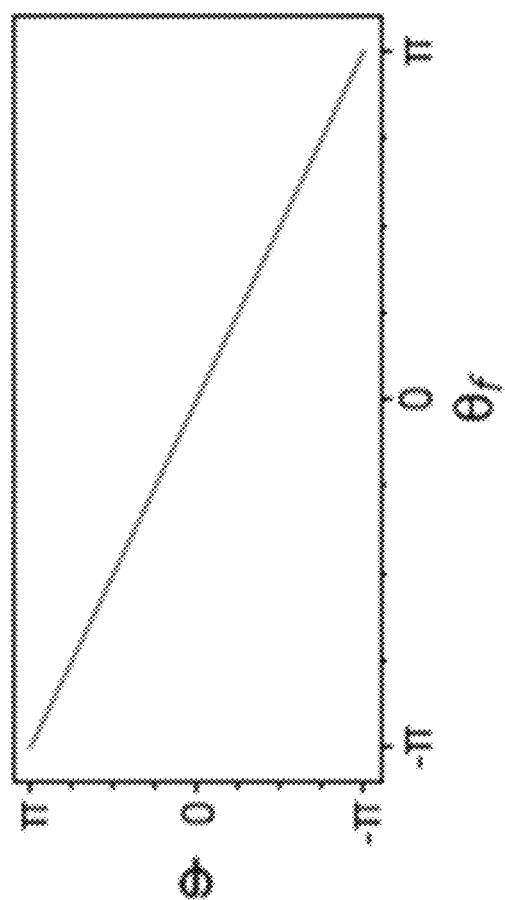
FIG. 6 illustrates 1:1 transduction of rotation to phase shift.

In an aspect of the disclosure, the probe beam and/or the conjugate beam reflected by the PBS 14D is provided to a one-to-one optical transduction module(s). An optical transduction module may be placed in one or both of the paths. The components of the optical transduction module may depend on the operation mode of the system, e.g., spin noise spectroscopy, magnetic circular (MCD), or MOKE (or Faraday measurement mode) performed in transmissive or reflective configurations. For example, as shown in FIG. 1, the system 1 is for spin noise spectroscopy and uses a transmissive mode through the sample 40. In this aspect of the disclosure, the one-to-one optical transduction module comprises two quarter wave plates (λ/4) 20B/C for one of the arms and λ/4 20D/E for the other arm. The λ/4 20B/C or 20D/E sandwich the sample 40. The first λ/4 20B/20D of the pair converts linearly polarized beams (V-polarized light) into circularly polarized light. In an aspect of the disclosure, one of the quarter waveplates 20B/20D may cause a left circular polarization and the other may cause a right circular polarization. Due to the Faraday effect in the sample 40, linearly polarized light acquires a polarization rotation $\Theta_F$ while circularly polarized light field acquires a phase shift. The second λ/4 20C/20E then converts the circularly polarized light back to linearly polarized light. The resulting phase shift of the light after this optical circuit is $\varphi=\arg(\cos(\theta_F)-i\sin(\theta_F))$, where $\arg(x)$ is the phase for an $x\in\mathbb{C}$. Advantageously, by transducing the polarization rotation to an optical phase shift, a signal becomes immune to polarization changes (that would serve as unwanted artifacts) induced by optics downstream before the homodyne detection module 30A/30B. This is particularly beneficial in implementations utilizing free-space optical components that are polarization sensitive. For instance, dielectric mirrors (such as element 22) that help to minimize the loss in the optics train induce unwanted polarization rotation that is hard to correct for in the absence of the polarization to phase transduction described herein. FIG. 6 illustrates an example of the relationship between the polarization rotation and phase shift due to the one-to-one optical transduction module.

In an aspect of the disclosure, the optical transduction module may be on a motorized stage and a processor may be configured to move the motorized stage such that the optical transduction module(s) may be positioned in the path of a beam(s) or offset from the beam depending on whether the beam(s) is to interact with the sample 40. In other aspects, if the system 1A is designed for only one beam to interact with the sample 40, one of the optical transduction modules may be omitted from the system.

The respective beams (probe or conjugate output from the PBS 14D) may be collimated after the OPA by lens 16D.

In some aspects of the disclosure, the sample 40 may be positioned within a cryostat 50 (such as shown in FIG. 4). The cryostat 50 may be a dilution refrigerator. The sample may be held at a temperature as low as 10 mK, or the temperature of the sample may be swept to a temperature of interest. The sample 40 may be positioned on a sample holder (not shown). The sample holder may also be transmissive to the beam(s) (in transmissive mode). A three-axis vector magnet 54 (as shown in FIG. 4) may be positioned around the sample. Although the cryostat 50 and vector magnet 54 are only shown in FIG. 4 with respect to system 1D, these components may also be used in the other systems such as sensor systems 1A-1C and 1E. A single-axis magnet may also be used instead of a vector magnet. In an aspect of the disclosure, a processor may control the magnitude of the field generated by the magnet 54. In some aspects, the processor may scan the magnitude between two values in increments.

In an aspect of the disclosure, the cryostat 50 may have multiple optical windows 52 (one for light to interact with the sample 40 and another for the interacted light to leave the cryostat 50). When reflective mode is used, the optical window 52 may be the same.

In FIG. 1, the first λ/4 20B/20D of the pair (in the optical transduction module) may be above the cryostat 50 and the second λ/4 20C/20E of the pair (in the optical transduction module) may be below the cryostat 50. Both may be aligned with the windows 52. Between the first λ/4 20B/20D and the sample 40 may be a series of optics and an objective lens to focus the beams onto the sample. The sample may be any sample that is responsive to a magnetic field and produces a measurable change in light.

In an aspect of the disclosure, the optical transduction module maintains a V-polarization of the light that is to reach the dual homodyne detection modules 30A/30B.

The light (either interacted with the sample 40 or bypassed the sample 40) may be steered to the dual homodyne detection modules 30A and 30B via one or more mirrors 22. As noted above, in FIG. 1 (system 1A) both paths interact with the sample 40.

Each homodyne detector 30A/30B (also referred to as homodyne detection module) comprises two balanced detectors and a beam splitter. The two balanced detectors may be photo diodes. The detector is not limited to photo diodes and other photodetectors may be used. The beam splitter sends half of the incident light to each of the two balanced detectors. The incident light comprises a respective local oscillator 32A/32B and the light interacted with the sample (or bypassed) (e.g., probe beam and conjugate beam). As noted above, one or both LO 32A/32B may be generated with the pump beam (or source beam). In other aspects of the disclosure, one or both LO 32A/32B may have their respective independent light sources. Each local oscillator 32A/32B is wavelength (frequency) matched with the respective probe and conjugate beams (mode matched). The power of the independent source may also be independently controlled from the pump beam and the probe beam. In an aspect of the disclosure, the power of the LO 32A/32B is orders of magnitude greater than the probe/conjugate beam.

In an aspect of the disclosure, the phase of the LO 32A/32B in each detector 30A/30B may be varied. The varying of the phase may be based on a determined SNR for the measurement or sensitivity for the different measurement modes. For example, the phase may be changed to achieve a maximum SNR or sensitivity for the different measurement modes. The phase shift of the LOs 32A/32B may be based on the rotation (phase shift of the light interacting with the sample). The phase of the LO 32A/32B may be changed by the lengthening or shortening a path the light from the source of the LO takes to the detector 30A/30B. In some aspects, a piezoelectric device 28 may be inserted in the path(s) of the respective LO 32A/32B. The piezoelectric device 28 may controlled by a processor via the control 29 (controller). The control (controller) may include a voltage/current source to cause the piezoelectric device 28 to modify the LO phase. In other aspects of the disclosure, the path may be increased/decreased by a delay stage such as a stage having motorized mirrors which are controlled by the processor.

The balanced detector in each homodyne detector 30A/30B outputs a signal (shown in the figures as "-") that may or may not carry a magneto-optical signature (if that arm did or did not interact with the sample). The signal generated by each homodyne detector 30A/30B individually does not exhibit quantum enhanced sensitivity.

The output of each homodyne detector 30A/30B is sent to a processor 31A. In an aspect of the disclosure, the processor 31A may combine homodyne detector signals as a phase sum signal. The phase sum signal can be processed, e.g., with a spectrum analyzer, to generate a spin noise spectrum. Additionally or alternatively, the processor may combine the homodyne detector signals as an intensity difference signal to determine a magnetic circular dichroism. Further, since the rotation/phase relationship is known because of the one-to-one transduction, the processor may convert the phase-sum signal into the spin noise spectrum (over a given spectral band). In some aspects of the disclosure, the processor may have a look up table prestored in a memory to store a relationship between the phase-sum signal and the spin noise.

In other aspects, when either of the probe beam or conjugate beam bypasses the sample, the processor may combine the homodyne detection module outputs as described above (in a phase sum signal) to determine the spin noise (over a given spectral band).

In some aspects, the processor 31A is configured to instruct a display device to present information relating to the determined spin noise.

It was noted above that the probe and the conjugate output by the nonlinear element 24A are in a squeezed joint state. Processor 31A can access an appropriate squeezed quadrature by instructing control 29 (controller) to adjust the phase of LO 32A to a value $\Phi_p$ and the phase of LO 32B to a value $\Phi_c$, such that the phase sum signal obtained by processor 31A has the lowest noise floor or the maximum SNR. Alternatively, the processor 31A can access the squeezed intensity difference quadrature in the following manner. Here, the processor 31A instructs control 29 to adjust the phase of LO 32A to another value $\Phi'_p$ and the phase of LO 32B to another value $\Phi'_c$, such that the intensity difference signal obtained by the processor 31A has the lowest noise floor or the maximum SNR. Note that at this setting $\{\Phi'_p, \Phi'_c\}$, the phase sum signal obtained by the processor 31A is antisqueezed with noise greater than the shot noise level. In this manner, the LO phase setting $\{(\Phi_p, \Phi_c)\}$ can be selected to perform Kerr and Faraday rotation measurements based on the phase sum signal and the LO phase setting $\{\Phi'_p, \Phi'_c\}$ can be selected to perform magnetic circular dichroism measurements based on the intensity difference signal.

In FIGS. 1-5, the respective LO are represented by the same line type as the probe or conjugate beams they are paired with. LO 32A for the probe beam is shown with a dash and dotted line and the LO 32B is shown with dots.

FIG. 2 illustrates an example of a system 1B configured for a Faraday rotation measurement without a spin noise measurement. In the example depicted in FIG. 2, only the probe beam interacts with the sample 40, however, the Faraday rotation measurement is not limited to having only the probe beam interacting with the sample 40 and the interaction shown in FIG. 2 is only provided for a different view from FIG. 1. In the Faraday rotation measurement, the beams (either the probe beam, the conjugate beam or both) which are incident on the sample 40 are modulated. In this aspect of the disclosure, a photoelastic modulator (PEM) 36 may be used to modulate the polarization state of a respective beam at a target frequency. Different PEMs 36 may be used in the system where a PEM may be selected based on a nominal frequency. In an aspect of the disclosure, the PEM 36 may be positioned downstream of the PBS 14D. In some aspects of the disclosure, the PEM 36 may replace the first λ/4 20B/20D of the pair (in the optical transduction module).

In some aspects of the disclosure, measurement configurations may be changed by moving the PEM 36 into and out of the beam path(s) and moving the first λ/4 20B/20D (in the optical transduction module) into and out of the beam path(s) using a motorized stage. A processor may control the motorized stage.

Similar to above, each homodyne detection module 30A/30B may output a signal for further processing 31B by a processor. Here, the homodyne signal is modulated at the PEM frequency. Thus, the processor demodulates the signal.

The processor may determine the Faraday rotation imparted by the sample 40 based on the sum of the homodyne detection module signals 30A/30B.

In some aspects of the disclosure, when both beams are incident on the sample (as shown in FIG. 2), the processor may subtract the homodyne detection module signals (from module 30A/30B) (intensity difference signal) to determine the magnetic circular dichroism response of a sample, e.g., where light interacting with the sample has left circular polarization and right circular polarization. In other aspects of the disclosure, the processor may add the two homodyne detection module signals (from module 30A/30B) (phase-sum signal) to determine the Faraday rotation. The processor may use a pre-stored look-up table correlating the determined values with the rotation angles. The prestored look up table may be populated based on the one-to-one transduction accounting for noise/losses in the optics. Note that the processor 31B can access the squeezed joint state of the probe and the conjugate either in the phase sum quadrature or in the intensity difference quadrature as described above in connection with FIG. 1.

Referring again to FIG. 2, in an aspect of the disclosure, the Faraday rotation may be determined for a single point in the sample. In other aspects of the disclosure, a two-dimensional image may be created for the Faraday rotation. The two-dimensional image may have a plurality of pixels. The image may be generated by scanning the beam(s) (probe and/or conjugate) or moving the sample 40.

Figure 7A:
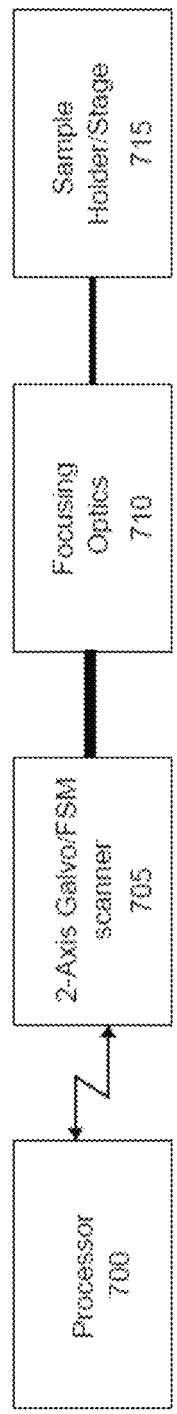
FIGS. 7A and 7B illustrate examples in an image acquisition system in accordance with aspects of the disclosure.
Figure 7B:
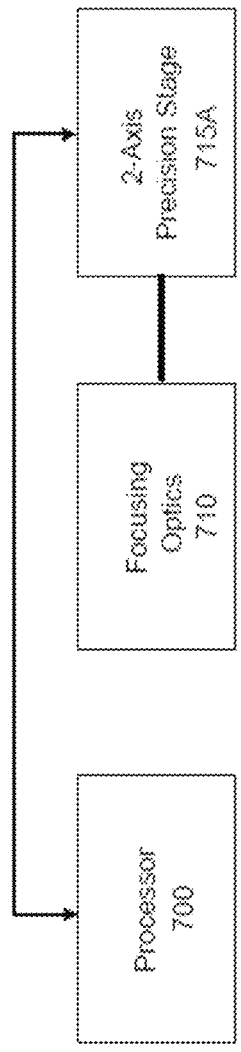

FIGS. 7A and 7B illustrate two examples in an image acquisition system used in conjunction with the optical setup(s) described herein. In an aspect of the disclosure, the processor 700 may control either a two-axis galvo scanner or fast-scanning mirror 705 to scan light into the focusing optics 710 and in turn onto the sample substrate holder 715 (sample) or control a 2-axis precision linear table 715A to move in an x- and y direction to cause a fixed position light to be scanned across the sample 40. The processor 700 and the scanner 705 may be external to the cryostat 50. Some of the focusing optics 710 may be external to the cryostat 50 while some of the optics 710 may be within the cryostat 50. The number of lenses in the focusing optics 710 may be system based. In some aspects, four lenses may be used. In others, two lenses may be used. The 2-axis precision linear table 715A may be internal to the cryostat 50. In other aspects, the image may be generated for the spin noise.

In other aspects of the disclosure, depending on the sample, the measurements (Faraday, Kerr, magnetic circular dichroism, and spin noise) may be made when the probe and conjugate beams are vacuum seeded, e.g., where the pump beam is the only "beam" input to the nonlinear element. FIG. 3 illustrates an example of a vacuum-seeded system 1C. As shown in FIG. 3, the system 1C is configured for a spin noise measurement where the conjugate beam is bypassed from the sample 40. However, the system 1C may be used with both the probe beam and the conjugate beam incident on the sample. Additionally, the system 1C is not limited to spin noise measurements and may be used for other measurements such as Faraday measurements without spin noise.

In some aspects of the disclosure, for vacuum seeding the probe beam, certain elements in system 1A may be omitted.

However, in other aspects of the disclosure, the components may remain in the system 1C, but a beam block 26A may be positioned as shown in FIG. 3 to block the intermediate beam since it is not needed to produce a probe beam to be input into OPA 24A. In an aspect of the disclosure, this beam block 26A may be on a motorized stage. A processor may be configured to control the motorized stage to move the beam block in and out of the intermediate beam path as needed. The position of the beam block 26A is not limited to the position shown in FIG. 3 and may be in other positions along the light path upstream of the nonlinear element. For example, the beam block 26A may be positioned downstream of the λ/2 12B. In other aspects of the disclosure, when the source beam is horizontally polarized, elements 12A, 12B, 14A, 14C, and 26A can be omitted, so the entirety of the source beam can be used as a horizontally polarized pump beam, the latter to be input into the nonlinear element.

Squeezed vacuum states minimize optical heating of the sample 40. However, because the sensitivity limits are determined primarily by the total power at the homodyne detection module(s) 30A/30B and the squeezing generated by the OPAs 24A/24B), the measurement sensitivity is still improved compared to classical measurements, and the LO 32A/32B's power can be controlled to increase the power on the homodyne detection module(s) 30A/30B. Moreover, the processor 31A can access the squeezed joint state of the probe and the conjugate either in the phase sum quadrature or in the intensity difference quadrature as described above in connection with FIG. 1.

FIG. 4 illustrates another system 1D configured in reflective mode with vacuum seeding in accordance with aspects of the disclosure. In an aspect of the disclosure, the sample 40 may be prepared to have a reflective coating to reflect incident beams backward. The same window 52 may be used for transmission and reflection of the light. While FIG. 4 illustrates the sample 40 in a cryostat 50, the sample 40 does not need to be in a cryostat 50 (depending on the sample). In FIG. 4, in this configuration both the probe beam and the conjugate beam are incident on the sample. However, the reflective mode is not limited to both being incident and only either the probe beam or the conjugate beam may be incident on the sample 40. Optionally, PEMs 36 could be incorporated between PBS 14E/14F and mirror 22 to allow for Kerr/Faraday measurements (without a spin noise spectral measurement). The forward and reflected paths are shown with parallel lines between the respective PBSs 14E/14F and sample 40.

In system 1D, the optical transduction module may only have one λ/4 20B/20D (per path). This is because the beam is reflected back over the same path and the same λ/4 20B/20D acts as the first λ/4 and the second λ/4. Additionally, another PBS 14E is added to the path (of light that will be incident on the sample). In FIG. 4, PBS 14E is positioned in the probe beam path and PBS 14F is positioned in the conjugate beam path. This is to separate the forward light and the reflected light. The PBS 14E/14F transmits V-polarized light (light going toward the sample) and reflective of H-polarized light (light reflected from the sample).

Similar to above, a processor may determine the spin noise spectrum (processing 31C) using the signals from the dual homodyne detection modules 30A/30B. In this case, the spin noise spectrum is of the Kerr rotation. Further, the processor 31C can access the squeezed joint state of the probe and the conjugate either in the phase sum quadrature or in the intensity difference quadrature as described above in connection with FIG. 1.

FIG. 5 illustrates an example of a full magneto-optical sensor system 1E in accordance with aspects of the disclosure. In this example, there are two OPAs 24A and 24B. One OPA is positioned upstream of the sample 40 and another OPA is positioned downstream of the sample 40. The system 1E (illustrated in FIG. 5) is similar to the system 1A (illustrated in FIG. 1) with the addition of components associated with the second OPA. In system 1E, a beam splitter (BS) 34 is added downstream of the laser 10 and upstream of the first half waveplate 12A to divide the source beam into portions for the first OPA 24A and the second OPA 24B. One or more mirrors 22 may be used to direct the portion of the source beam toward the second OPA 24B. The second OPA may be the same type of nonlinear element as the first OPA (made from the same material).

Additional lenses may be used such as lens 16B to focus the beam onto the second OPA 24B. Another lens 16E may be used to focus the probe beam and the conjugate beam that interacted with the sample 40 and then were further amplified by the second OPA 24B, as explained below. As illustrated, both the probe beam and the conjugate beam interacted with the sample, however, as described above, both are not required to interact with the sample and either the probe beam or the conjugate beam may interact with the sample 40, however both the probe beam and the conjugate beam are further amplified by the second OPA 24B.

The PBS 14G is positioned to reflect the probe beam and the conjugate beam and direct the same to the OPA 24B. As noted above, the optical transduction module maintains a V-polarization of the pump/conjugate beam. The portion of the source beam that is horizontally polarized is transmitted through PBS 14G to serve as the second OPA 24B's horizontally polarized pump beam. The pump beam, probe beam and conjugate beam are spatially offset prior to entering the second OPA 24B. The beams are focused and overlapped in the OPA 24B and the probe beam and the conjugate beam are amplified by the second OPA 24B's pump beam. In an aspect of the disclosure, the temperature of the OPA 24B may be controlled 25 in the same manner as described above. The amplified probe beam and the conjugate beam are reflected by another PBS 14H, so the amplified probe beam is directed to detection module 30A and the amplified conjugate beam is directed to homodyne detection module 30B.

While the full magneto-optical sensor system 1E is illustrated for spin noise measurement (of Faraday rotation), the full sensor system may be configured in any manner as described herein such as transmission mode for Faraday rotation measurement without spin noise (either or both probe beam and conjugate beam interacting with sample), vacuum seeding the probe (or low power seeding as described above), reflective mode for spin noise measurement of Kerr rotation (either or both probe beam and conjugate beam interacting with sample), vacuum seeding the probe (or low power seeding as described above), etc. Additionally, the processor 31A can access the squeezed joint state of the probe and the conjugate either in the phase sum quadrature or in the intensity difference quadrature as described above in connection with FIG. 1.

Referring again to FIG. 5, the use of the second OPA 24B reduces the detrimental effect of loss in the homodyne detection module(s) 30A/30B.

Figure 8:
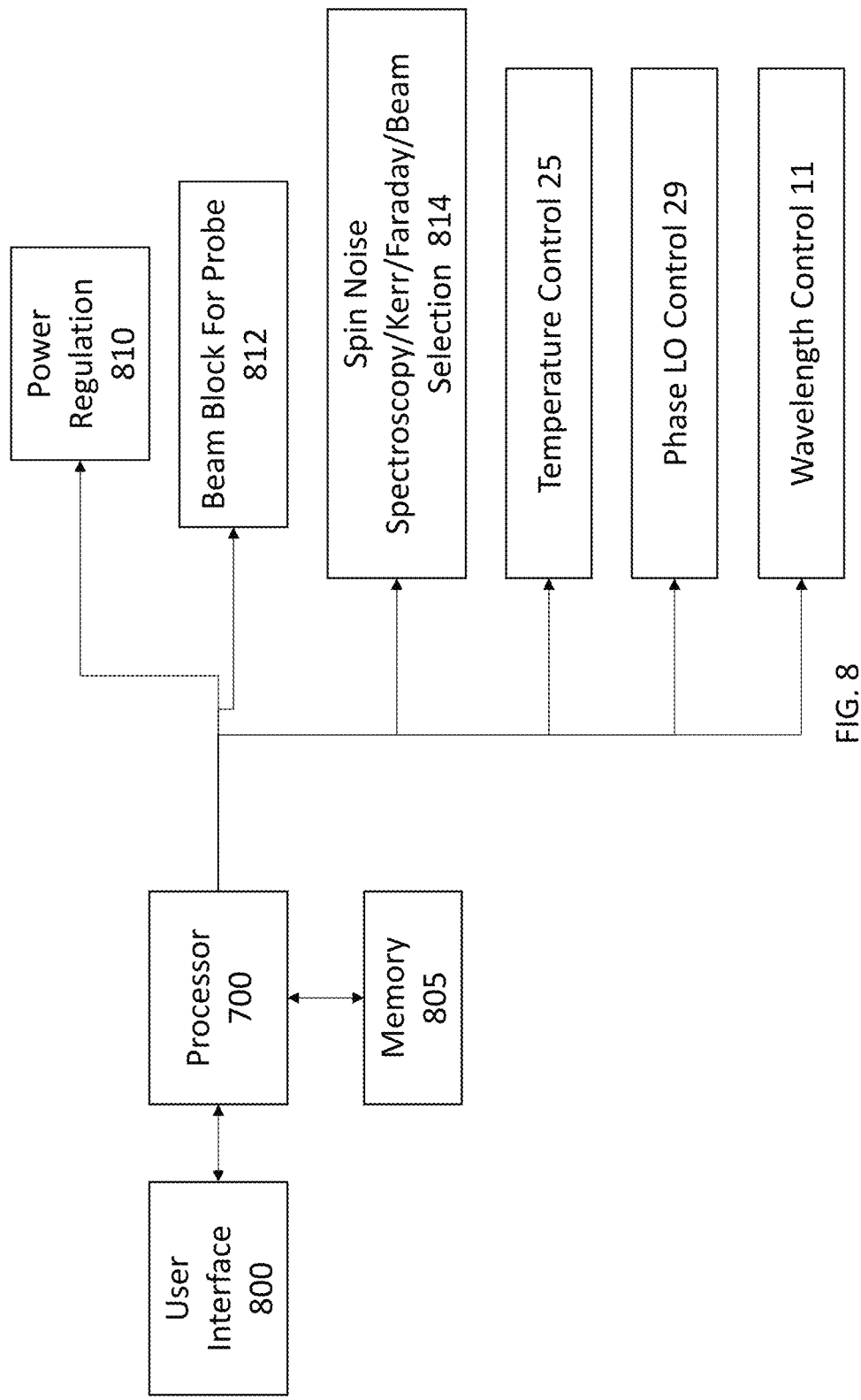
FIG. 8 illustrates a block diagram of a control in accordance with aspects of the disclosure.

FIG. 8 illustrates a block diagram for controlling the systems described herein in accordance with aspects of the disclosure. The control may comprise a processor 700, a memory 805 and a user interface 800. The processor 700 may be one or more CPUs. In other aspects of the disclosure, the processor 700 may be a microcontroller or microprocessor or any other processing hardware such as an FPGA. In an aspect of the disclosure, the processor 700 may be configured to execute one or more programs stored in a computer readable storage device (such as memory 805). The memory 805 can be RAM, persistent storage, or removable storage. A storage device is any piece of hardware that is capable of storing information, such as, for example without limitation, data, programs, instructions, program code, and/or other suitable information, either on a temporary basis and/or a permanent basis. The processor 700 may be the same processor as described above in connection with any of FIGS. 1-5 and thus, the processing (processors 31A-31C) described above may be one or more CPUs. In other aspects of the disclosure, the processors described above may be a microcontroller or microprocessor or any other processing hardware such as an FPGA. In an aspect of the disclosure, the processor 31A-31C may be configured to execute one or more programs stored in a computer readable storage device.

In an aspect of the disclosure, the user interface 800 may be in the same device as the processor 700. For example, the user interface 800 and processor 700 may be incorporated in a personal computer or laptop and the control program installed on the same. In other aspects of the disclosure, the user interface 800 may be located at a mobile terminal such as a mobile telephone or a tablet and the input is via an application in the device. For example, the user interface 800 may be a touchscreen on the mobile telephone or tablet. The control information may be transmitted to the processor 700 via a wireless or wired network. In some aspects, the wireless network may be a Local Area Network or cellular network. In other aspects, the user interface 800 may be a keypad. In some aspects, the user interface 800 may appear on a screen in the form of a graphical user interface (GUI). The GUI may be provided in the form of a template for a user or operator to enter measurement properties or configurations. For example, the GUI many include a space to enter the sample type, laser wavelength, desired measurement, e.g., spin noise, transmissive (Faraday) or reflective mode (Kerr), probe vacuum seeded, power levels (probe, pump, LO, etc.).

In other aspects of the disclosure, the processor 700 may include a look up table for measurement properties and configurations based on an input sample type. In an aspect of the disclosure, the processor 700 controls the laser power and wavelength based on the sample via the wavelength control 11 as described above. The processor 700 may also control the ratio of the pump/intermediate (and thus the probe) power via a power regulation 810 (combination of the λ/2 12A and PBS 14A). The power regulation may include a power control for the LO 32A/32B. In other aspects, the power regulation may control the power of the pump (after PBS 14A via λ/2 12C). The processor 700 may control a rotatable stage as described above. The ratio (pump/intermediate (and thus the probe)) may be scanned as needed.

In other aspects, the processor 700 may control the motor 812 for the beam block 26A to move into the path of the intermediate/probe to block the same from the OPA 24A for vacuum seeded operation. The processor 700 may also control motors (and thus the position) of the optical components based on a measurement selection. For example, when a Faraday or Kerr rotation (without spin noise) is selected by the user, the processor 700 may control the PEM 36 to be positioned in the path of either the probe beam and/or conjugate beam as described above (control 814). When the spin noise measurement is selected, the processor 700 may control the λ/4 20B/20D to be positioned in the place of the PEM 36. In some aspects, the PEM 36 and the λ/4 20B/20D may be mounted on a stage such that one of the two may be moved into position. The processor 700 may also control position of the optics based on whether the probe beam, the conjugate beam or both the probe beam and the conjugate beam is incident on the sample 40. For example, the processor 700 may control the position of the optical transduction module to be positioned in a path or outside of the path via motorized stages. In some aspects, the processor 700 may also control position of the λ/4 20B-20E based on the measurement selection (e.g., Faraday or Kerr). The processor 700 may move the λ/4 20C/20E which is below the sample 40 into and out of the path as needed.

The processor 700 may also be connected to the LO phase control 29 (controller) to scan the phase of each LO 32A/32B based on a calculated SNR or sensitivity determined from the phase sum signal and/or the intensity difference signal.

The processor 700 may also control the heaters in the temperature control 25 based on a sensed temperature or measured gain to maintain the target temperature of the OPA(s) 24A/24B.

Prior to turning the laser(s) 10 ON, the processor 700 controls or maintain the position of the optical components based on the user input received from the user interface 800. For example, when the user indicates that the measurement does not include spin noise, the processor 700 causes the PEM 36 to be positioned in a path to the sample 40. Similarly, when the user indicates that both probe/conjugate beam are to be incident to the sample 40, the processor 700 controls or maintains the optical transduction module to be in the path of both. Similarly, when the user indicates vacuum seeding, the procedure 700 causes the beam block 26A to be positioned as described above.

The processor 700 also determines whether the input contains specific ratio instructions for the pump/intermediate (and thus the probe) power or a specific power level for the LOs 32A/32B. In response to any specific instructions, the processor 700 controls the power regulation, e.g., angle of the λ/2 12A upstream of the PBS 14A based on the instruction. Similarly, the processor 700 may also control the power of the LO 32A/32B. The processor 700 also initializes the phase of the LO 32A/32B for each of the homodyne detection modules 30A/30B. The initial phase may be a default minimum or maximum phase. The initial phase may be a final phase of a previous measurement.

The processor 700 also monitors the temperature sensor in the control 25 and determines if the temperature is in the target range.

Once the optics and power are initially set (and temperature is within the target range), the processor 700 may turn the laser ON. In some aspects, the processor 700 may determine the wavelength of the laser and the appropriate OPA operating conditions based on the target sample 40. As noted above, the operating wavelength of the laser may be based on the vapor cell. In other aspects of the disclosure, the squeezing parameter may be tuned for a given bandwidth by changing temperature, angle of the beams, beam size, etc., as described above.

The processor 700 determines the selected measured value (either Faraday rotation, Kerr rotation, MCD, or spin noise) in a manner described above at the initial phase of the LO based on the detection signals from the dual homodyne detection modules 30A/30B. The processor 700 may determine a SNR (or sensitivity) based on the determination (phase sum signal and/or the intensity difference signal). In some aspects, if the SNR is higher than a threshold, the initial phase angle may be used for subsequent measurements. The processor 700 may scan the phase of each LO 32A/32B using the control 29 and determine the phase associated with the highest SNR (or sensitivity). In an aspect of the disclosure, when determining the phase with the highest SNR, a predetermined power ratio of pump/intermediate (and thus the probe) may be used.

Once the phase of each LO 32A/32B is determined, the processor 700 may scan the LO power between a first power level and a second power level at set increments and the power of the probe also at set increments to determine the rotation (and SNR and sensitivity).

In an aspect of the disclosure, once the measurement parameters for having the highest SNR (or sensitivity) are determined, the processor 700 may scan the light across the sample 40 in a manner as described above to generate a 2D image.

In accordance with aspects of the disclosure, a 10 nrad/$\sqrt{Hz}$ sensitivity may be achieved with optical power as small as 1 μW (of the probe beam) in a truncated magneto-optical sensor system such that a realistic T=83 mK can be maintained in commercially available dilution refrigerators (cryostat 50). This is achieved by controlling the phase and power of the LO 32A and the power of the probe beam. This sensitivity is also achieved using the squeezing in the nonlinear element, e.g., squeezing parameter r. The sensitivity is impacted by the efficiency of the optics. Losses in the optics train may be defined with a transmission parameter of η, where η is the noise after the nonlinear element. While increasing the squeezing parameter will improve the sensitivity, the improvement becomes increasingly sensitive to η as r increases, especially when η is about 1 (limit). The 10 nrad/$\sqrt{Hz}$ sensitivity was achieved with η=0.92.

As described above, the power of the probe beam and LO 32A may be varied to maximize the improvement. The improvement is higher when the probe power is lower (inverse relationship), and the improvement may disappear when the probe power approaches the power of the LO 32A. However, the slope of the improvement drastically decreases when the power of the LO 32A is 100× the power of the probe beam.

FIGS. 1-5 disclose examples of configurations of sensor systems in accordance with aspects of the disclosure. The configurations of the sensor systems are not limited to the configurations that are illustrated in the figures. Any combinations of a nonlinear element (OPA), one-to-one optical transduction module and dual homodyne detection may be used for the sensor system. The sensor system may be a truncated sensor system or a full sensor system; one or both of the probe and conjugate beam(s) may interact with the sample 40; the probe and conjugate beams injected into the nonlinear medium may have a low power or be vacuum states; the polarization state of one or both of the probe and conjugate beam(s) may be modulated; the sample 40 may be interacted in a transmissive or reflective mode; the sample 40 may be positioned within a cryostat 50 or outside thereof; the LO 32A/32B may be seeded with the source beam or independently generated and power controlled.

In some aspects of the disclosure, as described above, the sensor systems, e.g., 1A-1E, may be configured by moving optics into and out of paths. However, in other aspects of the disclosure, the sensor systems may be dedicated for a specific configuration where the components are fixed in position and the processor need not move any optics.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein.

As used herein terms such as "a", "an" and "the" are not intended to refer to only a singular entity but include the general class of which a specific example may be used for illustration.

As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A nonlinear interferometer system comprising:
a laser module configured to produce a source beam which is used to produce a pump beam of light having a first frequency f1;
a nonlinear medium positioned to receive at least the pump beam and issue the pump beam, a probe beam of light having a second frequency f2, and a conjugate beam of light having a third frequency f3 such that (f1−f2)=(f3−f1), wherein the nonlinear medium is configured to produce at least one of the probe light and the conjugate light based on interaction of the received light with the nonlinear medium, and wherein the issued beams are linearly polarized;
optics configured to route the probe beam along a first path to a sample or the conjugate beam along a second path to the sample or both the probe beam and the conjugate beam to the sample, wherein the sample imparts a Faraday polarization rotation or a Kerr polarization rotation to the light that interacts with the sample;
an optical transduction module configured to impart to the interacted light an optical phase shift that is a 1:1 transduction of the polarization rotation caused by the sample on the light which interacted with the sample, the optical transduction module being disposed in the first path or the second path or both the first path and the second path;
a first homodyne detection module configured to receive the probe beam at the end of the first path and output a first detection signal corresponding to the probe light, and a second homodyne detection module configured to receive the conjugate beam at the end of the second path and output a second detection signal corresponding to the conjugate light, wherein at least one of the probe light or the conjugate light carries the optical phase shift; and
a processor configured to obtain the optical phase shift based on the first detection signal and the second detection signal and determine, based on the obtained optical phase shift at least one of the Faraday polarization rotation, the Kerr polarization rotation or a spin noise spectrum.

2. The nonlinear interferometer system of claim 1, comprising
an optical parametric amplifier that includes the nonlinear medium.

3. The nonlinear interferometer system of claim 1, wherein the nonlinear medium is selected from a group consisting of a vapor cell, a nonlinear crystalline material, a highly nonlinear fiber (HNF), a nonlinear optomechanical system, and an integrated nonlinear photonic medium.

4. The nonlinear interferometer system of claim 3, wherein the vapor cell is a Rb vapor cell.

5. The nonlinear interferometer system of claim 1, wherein the optical transduction module comprises:
a first quarter-wave plate (QWP) configured to convert incident light that is linearly polarized along a given direction, to corresponding light that is circularly polarized, wherein interaction of the sample with the circularly polarized light causes the optical phase shift of the interacted light, and
a second QWP configured to convert the interacted light that is circularly-polarized and phase-shifted to the interacted light that is phase-shifted and linearly polarized along the given direction.

6. The nonlinear interferometer system of claim 5, wherein the first QWP is upstream of the sample.

7. The nonlinear interferometer system of claim 5, wherein the second QWP is the first QWP.

8. The nonlinear interferometer system of claim 1, further comprising at least one photoelastic modulator (PEM), where the PEM is positioned in either the first path of the probe beam, the second path of the conjugate beam or both the first path and the second path, the PEM is configured to modulate the probe beam, the conjugate beam or both the probe beam and the conjugate beam at a target frequency.

9. The nonlinear interferometer system of claim 8, wherein the optical transduction module comprises:
the PEM which is further configured to convert incident light that is linearly polarized along a given direction, to corresponding light that is circularly polarized, wherein interaction of the sample with the circularly polarized light causes the optical phase shift of the interacted light, and
a QWP configured to convert the interacted light that is circularly-polarized and phase-shifted to the interacted light that is phase-shifted and linearly polarized along the given direction.

10. The nonlinear interferometer system of claim 1, wherein
the laser module is configured to produce the source beam used to produce the pump beam and the probe beam, and
the nonlinear medium is positioned to receive both the probe beam and the pump beam, and
configured to produce the conjugate light and amplify the probe beam based on the interaction between the pump light and the probe light with the nonlinear medium.

11. The nonlinear interferometer system of claim 1, wherein the nonlinear medium is positioned to receive only the pump beam, and configured to produce both the probe light and the conjugate light based on the interaction between the pump light with the nonlinear medium.

12. The nonlinear interferometer system of claim 1, further comprising a second nonlinear medium, positioned upstream of the first homodyne detection module and the second homodyne detection module and downstream of the nonlinear medium and positioned in the first path and the second path, to receive light interacted with the sample or both light interacted with the sample and light not interacted with the sample.

13. The nonlinear interferometer system of claim 1, wherein the first path or the second path bypasses the sample such that only the conjugate beam or the probe beam interacts with the sample while the other of the conjugate beam or the probe beam bypasses the sample,
the first homodyne detection module is configured to receive the phase-shifted interacted light and produce the first detection signal, and the second homodyne detection module is configured to receive non-phase-shifted light which did not interact with the sample and produce the second detection signal.

14. The nonlinear interferometer system of claim 11, wherein, to obtain the optical phase shift, the processor combines the first detection signal and the second detection signal as a phase-sum signal.

15. The nonlinear interferometer system of claim 10, wherein
both the probe beam and the conjugate beam are relayed to interact with the sample, the first homodyne detection module is configured to receive phase-shifted probe light after it has interacted with the sample and produce the first detection signal and the second homodyne detection module is configured to receive phase-shifted conjugate light after it has interacted with the sample and produce the second detection signal, and to obtain the optical phase shift, the processor is configured to combine the first detection signal and the second detection signal as a phase-sum signal.

16. The nonlinear interferometer system of claim 15, wherein the nonlinear interferometer system is further configured to measure a magnetic circular dichroism, wherein the processor combines the first detection signal and the second detection signal as an intensity-difference signal in order to measure the magnetic circular dichroism.

17. The nonlinear interferometer system of claim 1, wherein the sample is disposed in a cryostat, wherein the cryostat comprises one or more optical windows for receiving light to interact with the sample and/or light interacted with the sample.

18. The nonlinear interferometer system of claim 1, wherein each of the first homodyne detection module and the second homodyne detection module comprises a beam splitter and a pair of balanced photodetectors, wherein each of the first homodyne detection module and the second homodyne detection module receives a respective local oscillator and one of the first homodyne detection module and the second homodyne detection module receives the probe beam and the other of the first homodyne detection module and the second homodyne detection module receives the conjugate beam.

19. The nonlinear interferometer system of claim 18, wherein the processor is configured to control a phase of the respective local oscillator and amplitude of the respective local oscillator.

20. The nonlinear interferometer system of claim 19, wherein the phase and amplitude of the respective local oscillator is controlled based on a determined rotation.

21. The nonlinear interferometer system of claim 10, further comprising a power regulator positioned upstream of the nonlinear medium, wherein the processor is configured to control the power regulator and set a ratio of power of the pump beam and the probe beam.

22. The nonlinear interferometer system of claim 21, wherein the power regulator comprises a rotatable halfwave plate and a polarization beam splitter, wherein the processor controls the rotation of the rotatable halfwave plate.

23. The nonlinear interferometer system of claim 1, further comprising a user interface configured to receive power settings and sample setting.

24. The nonlinear interferometer system of claim 11, further comprising a moveable beam block configured to be positioned in a path of a beam used to produce the probe beam and positioned upstream of the nonlinear medium and outside the path, wherein when the moveable beam block is positioned in the path upstream of the nonlinear medium, the probe beam is vacuum seeded.

25. An imaging system comprising:
a display;
a substrate configured to hold the sample;
a two-dimensional (2D) motorized stage coupled to the substrate; and the nonlinear interferometer system of claim 8, wherein the processor is further configured to control the 2D motorized stage such that light to be interacted with the sample is scanned 2D across the sample and determine on a pixel-by-pixel basis the Faraday polarization rotation or the Kerr polarization rotation and cause an image to be shown on the display representing the determined Faraday polarization rotation or the determined Kerr polarization rotation.

26. An imaging system comprising:
a display;
a substrate configured to hold the sample;
a two-dimensional (2D) galvo-scanner or fast-scanning mirror positioned in a path of light to be interacted with the sample,
and the nonlinear interferometer system of claim 8, wherein the processor is further configured to control the 2D galvo-scanner or fast-scanning mirror such that the light to be interacted with the sample is scanned 2D across the sample and determine on a pixel-by-pixel basis the Faraday polarization rotation or the Kerr polarization rotation and cause an image to be shown on the display representing the determined Faraday polarization rotation or the determined Kerr polarization rotation.

27. An imaging system comprising:
a spectrum analyzer;
a substrate configured to hold the sample;
a two-dimensional (2D) motorized stage coupled to the substrate; and the nonlinear interferometer system of claim 1, wherein the processor is further configured to control the 2D motorized stage such that light to be interacted with the sample is scanned 2D across the sample and determine on a pixel-by-pixel basis a spin noise spectrum and cause an image to be shown on the spectrum analyzer representing the determined spin noise spectrum.

28. An imaging system comprising:
a spectrum analyzer;
a substrate configured to hold the sample;
a two-dimensional (2D) galvo-scanner or fast-scanning mirror positioned in a path of light to be interacted with the sample,
and the nonlinear interferometer system of claim 1, wherein the processor is further configured to control the 2D galvo-scanner such that the light to be interacted with the sample is scanned 2D across the sample and determine on a pixel-by-pixel basis a spin noise and cause an image to be shown on the spectrum analyzer representing the determined spin noise spectrum.

\* \* \* \* \*